(12) United States Patent
Duch et al.

(10) Patent No.: US 11,359,671 B2
(45) Date of Patent: Jun. 14, 2022

(54) SEALING DEVICE

(71) Applicant: Aktiebolaget SKF, Gothenburg (SE)

(72) Inventors: Daniele Duch, San Gillio (IT); Fausto Morello, Sommariva del Bosco (IT); Antonia Nastasi, Turin (IT); Laura Sguotti, Bricherasio (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/983,020

(22) Filed: Aug. 3, 2020

(65) Prior Publication Data

US 2021/0033149 A1 Feb. 4, 2021

(30) Foreign Application Priority Data

Aug. 1, 2019 (IT) .................. 102019000013581

(51) Int. Cl.
| | | |
|---|---|---|
| *F16C 33/78* | (2006.01) | |
| *B60B 27/00* | (2006.01) | |
| *F16C 33/80* | (2006.01) | |
| *F16C 19/18* | (2006.01) | |
| *F16J 15/3232* | (2016.01) | |
| *F16J 15/3256* | (2016.01) | |
| *F16J 15/447* | (2006.01) | |

(52) U.S. Cl.
CPC ...... *F16C 33/7823* (2013.01); *B60B 27/0073* (2013.01); *F16C 33/782* (2013.01); *F16C 33/805* (2013.01); *F16C 19/18* (2013.01); *F16C 33/7886* (2013.01); *F16C 2326/02* (2013.01); *F16J 15/3232* (2013.01); *F16J 15/3256* (2013.01); *F16J 15/447* (2013.01)

(58) Field of Classification Search
CPC .......... F16C 33/782; F16C 33/7823; F16C 33/7826; F16C 33/80; F16C 33/805; F16C 2326/02; F16C 19/08; F16C 19/18; F16C 33/7886; B60B 27/0073; F16J 15/3232; F16J 15/3256; F16J 15/447; F16J 15/4478
See application file for complete search history.

(56) References Cited

U.S. PATENT DOCUMENTS

| | | | |
|---|---|---|---|
| 2016/0003302 A1* | 1/2016 | Seno | F16C 33/7886 277/351 |
| 2016/0236509 A1* | 8/2016 | Gull | F16J 15/3264 |
| 2020/0332836 A1* | 10/2020 | Nastasi | F16J 15/4476 |

FOREIGN PATENT DOCUMENTS

| | | |
|---|---|---|
| DE | 112016003937 T5 | 5/2018 |
| FR | 3074861 | 6/2019 |

(Continued)

OTHER PUBLICATIONS

Search Report for corresponding Italy Patent Application No. 201900013581 dated Jun. 18, 2020.

*Primary Examiner* — Alan B Waits

(74) *Attorney, Agent, or Firm* — Reed Smith LLP

(57) ABSTRACT

A sealing device for bearing units is disclosed herein. The sealing device may comprise a static component and a dynamic component. The static component is provided with a shaped metal support, with a plurality of non-contacting sealing lips, and with two contacting lips. The dynamic component defines a labyrinth seal with a second sealing lip of said non-contacting sealing lips, a third lip, preferably non-contacting, being positioned along the labyrinth seal and having a full angular extension, so as to form a full seal against any ingress of contaminants into the bearing unit.

15 Claims, 1 Drawing Sheet

(56) References Cited

FOREIGN PATENT DOCUMENTS

| | | |
|---|---|---|
| JP | 2013190101 | 9/2013 |
| JP | 2015209957 | 11/2015 |
| KR | 100731779 | 6/2007 |
| WO | 2012019803 | 2/2012 |

* cited by examiner

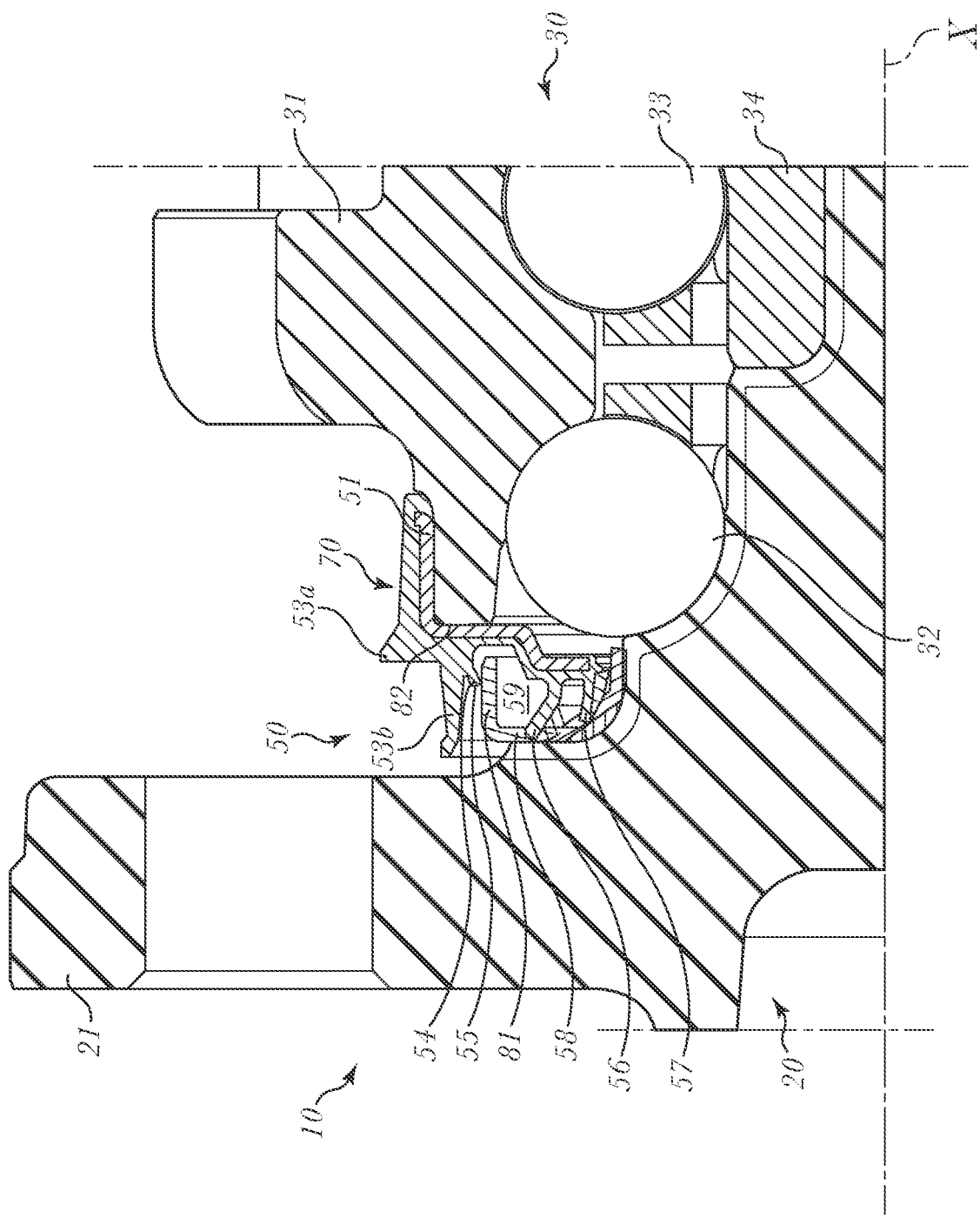

SEALING DEVICE

CROSS REFERENCE TO RELATED APPLICATION

This application is based on and claims priority to Italian Application No. 102019000013581, filed Aug. 1, 2019, under 35 U.S.C. § 119, the entire contents of which are herein incorporated by reference.

TECHNICAL FIELD

The present inventive concepts generally relate to a sealing device for providing a better seal against contaminants. This sealing device may be applied to a bearing unit, and is suitable for wheel hub assemblies of motor vehicles, and other assemblies provided with a bearing unit. The bearing unit according to the inventive concepts disclosed herein are those in which the outer ring of the bearing is stationary, while the inner ring of the bearing is rotatable. The sealing device disclosed herein are applicable to a bearing unit including a double ring of balls.

BRIEF DESCRIPTION OF THE DRAWINGS

The present inventive concepts will now be described in conjunction with reference to the attached FIGURE, which is provided to illustrate and not to limit the disclosed aspects, wherein like designations denote like elements.

FIG. 1 illustrates a cross section of a non-limiting example of embodiment of a sealing device.

DETAILED DESCRIPTION

One skilled in the art may appreciate that bearing units are usually exposed to contaminants of various types, for example, mud, dust and particulates in suspension and/or in solution. Consequently, bearing units, including those belonging to wheel hub assemblies for motor vehicles, need to be provided with sealing devices that protect them from attack by the aforementioned contaminants. Sealing devices according to conventional technologies include, for example, two-part cassette sealing devices, comprising, a rotatable portion, mounted on the radially inner ring, and a stationary portion, mounted on the radially outer ring. According to conventional technologies, the stationary portion of the seal comprises one or more lips of elastomeric material, which contact the rotatable portion and provide a seal for the inside of the bearing unit.

In order to optimize the sealing performance of the bearing unit while keeping friction low, both during operational conditions on the road and during the testing phase of the bearing unit, there is a known way of using sealing devices provided with a shield to protect an aperture of the bearing unit, and a non-contacting sealing lip facing the shield to make it as difficult as possible for mud and other contaminants to penetrate beyond the sealing device into the bearing unit.

In particular, severe conditions of use, however, sealing devices according to the conventional technologies have exhibited problems and drawbacks, such as, notably, a reduced sealing capacity. In order to overcome these problems a known solution has generally been to increase the number of sealing lips to make any ingress of contaminants more difficult. However, this solution, while resolving the aforementioned problem, is generally deficient as it makes the production of the sealing device particularly expensive in terms of both design and production costs.

The object of the inventive concepts disclosed herein is to provide a sealing device which, while retaining a fairly simple design and structure, enables a good and enforceable seal that is provided even in particularly severe conditions of use.

According to the inventive concepts disclosed herein, a sealing device and/or particularly advantageous embodiments having the characteristics defined in the attached claims is provided.

With reference to the attached FIG. 1, a wheel hub assembly 10 according to an example embodiment of the inventive concepts is indicated. The FIGURE shows a detail of the example of configuration.

The assembly 10 comprises a central axis of rotation X and a hub 20, which is rotatable and flanged, that is to say provided with a flange 21 transverse to the axis X, and a bearing unit 30. The bearing unit 30 comprises: a radially outer ring 31 which is stationary, a radially inner ring 20 defined by the hub 20, a further, rotatable, radially inner ring 34 mounted on, and fixed to, the hub 20; and two rings of rolling bodies 32, 33, in this example balls, interposed between the radially outer ring 31 and the radially inner rings 20 and 34.

One skilled in the art may appreciate that terms and expressions indicating positions and orientations such as "radial" and "axial" are to be interpreted as relating to the central axis of rotation X of the bearing unit 30. Whereas, expressions such as "axially outer" and "axially inner" relate to the assembled condition of the wheel hub assembly, and generally relates to a wheel side and to a side opposite the wheel side, respectively.

The wheel hub assembly 10 is provided with a sealing device 50, a two-part cassette sealing device, which is mounted on the axially outer side of the bearing unit between the flange 21 and the radially outer ring 31, and comprises a static component 70 mounted on the radially outer ring 31, and a dynamic component 58 mounted on the radially inner ring, which is rotatable.

The dynamic component 58 may be defined by a shaped metal shield 58, which is mounted axially behind the flange 21, and comprises a cylindrical tubular portion 81 extending from the flange 21 towards the radially outer ring 31 so as to axially cover an aperture 82 defined by the flange 21 and by the radially outer ring 31. The aperture 82 represents, in a general way, a point of ingress for any contaminants such as mud, dust and particulates in suspension and/or in solution, which by penetrating into the bearing unit might compromise its proper operation. Further, in order to protect the bearing unit, the static component 70 of the sealing device 50 comprises, a shaped metal support 51 mounted behind the radially outer ring 31; and a first and a second deflector lip 53a and 53b of elastomeric material, co-moulded onto the shaped metal support 51, of which the lip 53a is substantially outside the aperture 82, while the lip 53b extends substantially over the whole of the aperture 82 to reach the flange 21 without contact.

The static component 70 of the sealing device 50 is also provided with a pair of contacting lips 56, 57, also of elastomeric material, which are in contact with the metal shield 58 and define, together with the metal shield 58, an inner volume 59. However, it should be understood that the design, arrangement and number of the sealing lips could change without thereby departing from the protective scope of the example embodiments of the present disclosure.

The ingress of contaminants into the inner volume 59 may be limited by the presence of a labyrinth seal defined essentially by the second deflector lip 53b and by the metal shield 58. However, both in operating conditions and during the evaluation tests of the bearing unit, it may occur that the labyrinth seal as described above is unsuccessful, especially in particularly severe operating conditions, in totally preventing such contaminants from entering the inside of the volume 59, and therefore, with therefore with conventional solutions, it becomes difficult to keep the labyrinth seal accessible and to keep the volume 59 empty, which may possibly detract from the performance of the bearing unit.

Consequently, in order to improve the sealing capacity of the sealing device 50, the static component 70 further comprises a third lip 54 of elastomeric material, which is positioned along the labyrinth seal between the second deflector lip 53b and the volume 59. The third lip 54 is also co-moulded onto the metal support, and extends from a radially inner root of the second deflector lip 53b along a substantially conical generatrix. The third lip 54 is a preferably non-contacting lip positioned towards the metal shield 58, to block any passage of contaminants along the labyrinth seal, and is formed over 360° about the axis X.

In particular, the third lip 54 extends towards the cylindrical tubular portion 81 of the metal shield 58, with which an annular aperture 55 is defined, and, being made of elastomeric material, tends to reduce the aperture 55 in use, until it comes into sliding contact with the tubular portion 81. The flexibility of the third lip 54, which may be made of elastomeric material also enables the third lip 54 to be shaped according to the type of application.

Thus, the seal against any ingress of contaminants into the bearing unit is provided both for contaminants that fall from above, that is to say from the upper side of the sealing device 50, and for contaminants that are raised and/or sprayed from below, that is to say from the lower side of the sealing device 50. According to example embodiments of inventive concepts disclosed herein, which may be applicable to to the motor manufacturing applications, they provide greater efficiency owing to the better sealing performance in use, while avoiding corrosion problems due to the possible ingress of contaminants. Evidently, it also provides better performance on boggy and/or muddy road surfaces.

In addition to the example embodiments of the inventive concepts as described above, it is to be understood that numerous other variants exist. It is also to be understood by one skilled in the art that said example embodiments disclosed herein are provided solely by way of example and do not limit the inventive concepts, its applications, or its possible configurations. One skilled in the art may appreciate that numerous variations of the example embodiments described may be envisaged without thereby departing from the object of the inventive concepts as defined in the appended claims, interpreted literally and/or according to their legal equivalents.

The invention claimed is:

1. A sealing device for a bearing unit, comprising:
   a dynamic component; and
   a static component comprising:
      a metal support; and
      a plurality of sealing lips, the plurality of sealing lips including:
         a first deflector lip that does not contact the dynamic component; and
         a second deflector lip that does not contact the dynamic component; and a pair of sealing lips contacting the dynamic component, wherein the first deflector lip together with the dynamic component define a labyrinth seal; and
         a third sealing lip is positioned along the labyrinth seal and extends towards a radially outer surface of the dynamic component.

2. The sealing of claim 1, a metal shield member of the dynamic components includes a cylindrical member extending axially away from a radially extending component, wherein the third sealing lip extends from a portion of the second deflector lip in a radially inward direction towards the cylindrical member.

3. The sealing device of claim 2, wherein the first deflector lip is configured to, when assembled upon a bearing unit, extend from the metal support outside of an aperture defined by a flange of the bearing unit and a radially outer ring of the bearing unit, further wherein the second deflector lip is configured to extend from the metal support radially over the aperture and towards the flange, further wherein the third sealing lip defines a frustoconical shape.

4. The sealing device of claim 2, wherein the third lip contacts the cylindrical member.

5. The sealing device of claim 2, wherein the third lip does not contact the cylindrical member.

6. The sealing device of claim 1, wherein the third lip contacts the dynamic component.

7. The sealing device of claim 1, wherein the third lip does not contact the dynamic component.

8. A wheel hub assembly for motor vehicles, comprising:
   a hub;
   a bearing unit; and
   a sealing device, wherein the sealing device comprises,
   a dynamic component; and
   a static component comprising:
      a metal support; and
      a plurality of sealing lips, the plurality of sealing lips including:
         a first deflector lip that does not contact the dynamic component; and
         a second deflector lip that does not contact the dynamic component; and a pair of sealing lips contacting the dynamic component, wherein the first deflector lip together with the dynamic component define a labyrinth seal; and
         a third sealing lip is positioned along the labyrinth seal and extends towards a radially outer surface of the dynamic component.

9. The sealing device of claim 8, wherein the third lip contacts the dynamic component.

10. The sealing device of claim 8, wherein the third lip does not contact the dynamic component.

11. A cassette sealing device comprising:
    a first metal support annularly formed of a radial member and a cylindrical member extending from a radially outer end of the radial member, the cylindrical member having an outer cylindrical surface defining a first circumference about an axis of rotation;
    a second metal support annularly formed about the axis of rotation separate and apart from the first metal support;
    a plurality of sealing lips made of elastomeric material and formed upon the second metal support, including:
       a first deflector lip extending radially away from the first circumference;
       a second deflector lip extending axially from the second metal support radially outward of the first circumference;

a first sealing lip extending from the root of the second deflector towards the cylindrical member and defining a frusto-conical shape.

12. The sealing device of claim 11, wherein the first lip contacts the dynamic component.

13. The sealing device of claim 11, wherein the first lip does not contact the dynamic component.

14. The sealing device of claim 11, further comprising:
a pair of sealing lips extending from the second metal support and contacting the first metal support radially inward of the cylindrical member.

15. A wheel hub assembly, comprising:
a radially outer ring;
a radially inner ring having a radially extending flange;
the sealing device of claim 11 disposed between the flange and the radially outer ring, wherein the radial member of the first metal support extends radially along the flange and the second metal support is disposed on an axial end face of the radially outer ring facing the flange, further wherein second deflector lip extends over at least a portion of an aperture defined between end face of the radially outer ring and the flange.

* * * * *